US008692628B2

(12) United States Patent
Ishiyama

(10) Patent No.: US 8,692,628 B2
(45) Date of Patent: Apr. 8, 2014

(54) HIGH-FREQUENCY MODULE

(71) Applicant: Murata Manufacturing Co., Ltd., Nagaokakyo (JP)

(72) Inventor: Yoshiyuki Ishiyama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/029,036

(22) Filed: Sep. 17, 2013

(65) Prior Publication Data

US 2014/0015620 A1 Jan. 16, 2014

Related U.S. Application Data

(63) Continuation of application No. PCT/JP2013/055292, filed on Feb. 28, 2013.

(30) Foreign Application Priority Data

Feb. 28, 2012 (JP) .................................. 2012-041029

(51) Int. Cl.
*H01P 1/36* (2006.01)

(52) U.S. Cl.
USPC ........................................................ 333/24.2

(58) Field of Classification Search
USPC .................................................. 333/24.2, 1.1
See application file for complete search history.

(56) References Cited

U.S. PATENT DOCUMENTS

| 6,380,820 | B1 | 4/2002 | Sakamoto et al. |
| 7,139,214 | B2 * | 11/2006 | Atwood et al. ............... 365/149 |
| 2004/0203194 | A1 | 10/2004 | Hamasaki |
| 2009/0315656 | A1 | 12/2009 | Wada et al. |
| 2011/0228499 | A1 | 9/2011 | Takahashi |

FOREIGN PATENT DOCUMENTS

| JP | 2000-201005 A | 7/2000 |
| JP | 2004-311748 A | 11/2004 |
| JP | 2008-97073 A | 4/2008 |
| JP | 2010-10805 A | 1/2010 |
| JP | 2011-199602 A | 10/2011 |

OTHER PUBLICATIONS

Official Communication issued in International Patent Application No. PCT/JP2013/055292, mailed on May 28, 2013.

* cited by examiner

*Primary Examiner* — Stephen Jones
(74) *Attorney, Agent, or Firm* — Keating & Bennett, LLP

(57) ABSTRACT

In a high-frequency module, an input terminal, an output terminal and a ground terminal, which are arranged so as to be capable of being visually checked, and wiring line electrodes located on a mounting surface are electrically connected to each other by wires and therefore the connection state of a non-reciprocal circuit element to the wiring line electrodes on the mounting surface of the substrate can be easily visually checked and an impedance adjustment between the non-reciprocal circuit element and the wiring line electrodes located on the mounting surface of the substrate on which the non-reciprocal circuit element is mounted or electronic components mounted on the mounting surface can be easily performed by adjusting the lengths of the wires.

20 Claims, 3 Drawing Sheets

HIGH-FREQUENCY MODULE

BACKGROUND OF THE INVENTION

1. Field of the Invention

The present invention relates to high-frequency modules that include a substrate on which a non-reciprocal circuit element is mounted.

2. Description of the Related Art

To date, non-reciprocal circuit elements such as isolators and circulators have been employed in high-frequency modules such as power amplification modules of transmission circuit sections of communication terminals such as cellular phones and wireless LAN devices, by utilizing their characteristic of transmitting a signal in only a specific predetermined direction (for example, refer to Japanese Unexamined Patent Application Publication No. 2011-199602 (paragraphs 0025 to 0045, FIGS. 1, 2, 4 to 8 and so on)). As illustrated in FIG. 5 and FIG. 6, a non-reciprocal circuit element 100, which is mounted in a high-frequency module, includes, for example, a rectangular-parallelepiped-shaped ferrite 101, on which central electrodes 103 and 104 are provided, and a pair of permanent magnets 102 and is formed by sandwiching the ferrite 101 between the pair of rectangular-parallelepiped-shaped permanent magnets 102 such that a direct-current magnetic field B is applied to the ferrite 101.

The ferrite 101 has a rectangular parallelepiped shape having a pair of opposing main surfaces, is provided with a first central electrode 103 and a second central electrode 104, which are in a state of being insulated from each other, on its two main surfaces, and is provided with an input terminal 105, an output terminal 106 and a ground terminal 107 arranged in a straight line on a bottom end surface thereof. In addition, in order to decrease the size and profile of the high-frequency module, the non-reciprocal circuit element 100 is mounted on a substrate 2 without a yoke for preventing the direct-current magnetic field B of the permanent magnets 102 from leaking to the outside.

That is, the non-reciprocal circuit element 100 is mounted on the substrate 2 by respectively soldering the input terminal 105, the output terminal 106 and the ground terminal 107 using, for example, reflow soldering, to mounting electrodes 2a to 2c arranged in a straight line on the substrate 2, which is included in the high-frequency module. In addition, chip-like components 3 such as capacitors and resistors for adjusting the characteristics of the non-reciprocal circuit element 100 are respectively mounted on mounting electrodes 2d to 2h on the substrate 2 of the high-frequency module and the various components mounted on the substrate 2 are electrically connected to each other through wiring line electrodes provided on the substrate 2. By forming the non-reciprocal circuit element 100 in this way, the high-frequency module can be reduced in size and profile when compared to the structure of a high-frequency module in which a non-reciprocal circuit element, which is formed by arranging a ferrite having a copper wire wound therearound as a central electrode between a pair of permanent magnets, is mounted. FIG. 5 illustrates an example of a non-reciprocal circuit element and FIG. 6 is an exploded perspective view of the non-reciprocal circuit element of FIG. 5.

As has been described above, in the non-reciprocal circuit element 100, the terminals 105 to 107 provided on the lower end surface of ferrite 101 face the substrate 2 and are respectively connected to the mounting electrodes 2a to 2c of the substrate 2 via solder. There are sometimes variations between the thicknesses of the terminals 105 to 107 on the lower end surface of the non-reciprocal circuit element 100 due to the problem of the precision with which the terminals are formed. Consequently, there is a risk of the non-reciprocal circuit element being mounted on the substrate 2 in a tilted state. Therefore, when mounting the non-reciprocal circuit element 100 on the substrate 2, it is preferable that the amount of solder applied to each of the terminals 105 to 107 be finely adjusted, but in actual practice, it is difficult to finely adjust the amount of solder applied to each of the terminals 105 to 107 and there is a risk of the terminals 105 to 107 being short-circuited due to melted solder and of connection defects occurring between the terminals 105 to 107 and the mounting electrodes 2a to 2c due to there being too much or too little solder. In addition, there is a risk of the non-reciprocal circuit element being tilted on the substrate 2 depending on the amounts of solder.

Therefore, since the non-reciprocal circuit element 100 is mounted on the substrate 2 with its lower end surface on which the terminals 105 to 107 are provided facing the substrate 2, the connection states between the terminals 105 to 107 and the mounting electrodes 2a to 2c cannot be visually checked after the non-reciprocal circuit element 100 has been mounted on the substrate 2. In addition, when the non-reciprocal circuit element 100 is mounted on the substrate 2, it is necessary to match the impedances between the wiring line electrodes and electronic components provided on the substrate 2 and the non-reciprocal circuit element 100, and modifying the designs of the wiring line electrodes and the electronic components provided on the substrate 2 in accordance with the individual characteristics of non-reciprocal circuit elements 100, among which variations occur at the time of manufacture, in order to adjust the impedances is not realistic.

In addition, the terminals 105 to 107, which are connected to the mounting electrodes 2a to 2c of the substrate 2, are arranged in a straight line on the lower end surface of the ferrite 101 and therefore there is a risk of the non-reciprocal circuit element 100 being not well balanced in a mounted state on the substrate 2 and of the non-reciprocal circuit element 100 being fixed to the substrate 2 in a tilted state due to variations in the amounts of solder.

SUMMARY OF THE INVENTION

Accordingly, preferred embodiments of the present invention provide a technology in which the connection state between a non-reciprocal circuit element and a wiring line electrode or an electronic component on a mounting surface of a substrate can be easily checked and in which impedance adjustment between the non-reciprocal circuit element and a wiring line electrode located on the mounting surface of the substrate on which the non-reciprocal circuit element is mounted or an electronic component mounted on the mounting surface can be easily performed. In addition, preferred embodiments of the present invention provide a technology that prevents a non-reciprocal circuit element being tilted when mounted on a mounting surface of a substrate.

A high-frequency module according to a preferred embodiment of the present invention includes a substrate on which a non-reciprocal circuit element is mounted. The non-reciprocal circuit element includes a ferrite having a rectangular or substantially rectangular parallelepiped shape including a pair of opposing main surfaces, a pair of permanent magnets that are arranged at the two main surfaces so as to apply a direct-current magnetic field to the ferrite, an input terminal, an output terminal and a ground terminal provided on any one of side surfaces of the ferrite that are perpendicular or substantially perpendicular to the two main surfaces of the ferrite, a first central electrode that is provided on the ferrite, that has one end thereof connected to the input terminal and that has another end thereof connected to the output terminal, and a second central electrode that is provided on the two main surfaces in a state of being insulated from the first central electrode, that has one end thereof connected to the output terminal and that has another end thereof connected to the ground terminal. The non-reciprocal circuit element is arranged such that another side surface different from the side surface on which the input terminal, the output terminal and the ground terminal are arranged to face a mounting surface of the substrate and the non-reciprocal circuit element is electrically connected to a wiring line electrode located on the mounting surface or an electronic component mounted on the mounting surface via a connection member.

With the thus-configured invention, the non-reciprocal circuit element is provided with an input terminal, an output terminal and a ground terminal on any one of side surfaces of the ferrite perpendicular or substantially perpendicular to the two main surfaces of the ferrite. The input terminal, the output terminal and the ground terminal are arranged so as to be capable of being visually checked by arranging another side surface, which is different from the side surface on which the input terminal, the output terminal and the ground terminal are provided, so as to face a mounting surface of the substrate. The input terminal, the output terminal and the ground terminal, and wiring line electrodes located on the mounting surface or electronic components mounted on the mounting surface are electrically connected to each other via connection members. Therefore, the connection state of the non-reciprocal circuit element to a wiring line electrode or an electronic component on the mounting surface of the substrate can be easily checked and impedance adjustment between the non-reciprocal circuit element and a wiring line electrode located on the mounting surface of the substrate on which the non-reciprocal circuit element is mounted or an electronic component mounted on the mounting surface can be easily performed.

In addition, by arranging the other side surface, which is different from the side surface on which the input terminal, the output terminal and the ground terminal are provided, so as to face the mounting surface of the substrate, the non-reciprocal circuit element can be arranged on the mounting surface such that the entirety of that other side surface is in contact with the mounting surface of the substrate and therefore the non-reciprocal circuit element is well balanced in a mounted state on the substrate and the non-reciprocal circuit element is prevented from being tilted when mounted on the mounting surface of the substrate.

In addition, the high-frequency module according to a preferred embodiment of the present invention may further include a power amplifier and a branching circuit mounted on the mounting surface, an output side of the power amplifier and the input terminal of the non-reciprocal circuit element being connected to each other via a connection member and an input side of the branching circuit and the output terminal of the non-reciprocal circuit element being connected to each other via a connection member.

If this configuration is adopted, since the output side of the power amplifier and the input terminal of the non-reciprocal circuit element are connected to each other through a connection member and the input side of the branching circuit and the output terminal of the non-reciprocal circuit element are connected to each other via a connection member, the impedance between the power amplifier and the non-reciprocal circuit element and the impedance between the branching circuit and the non-reciprocal circuit element can be easily adjusted by adjusting the length, thickness, number and so forth of the connection members.

In addition, the connection member that is connected to the input terminal may be arranged so as to be perpendicular or substantially perpendicular to a direction of the direct-current magnetic field generated by the pair of permanent magnets.

If this configuration is adopted, penetration of the direct-current magnetic field generated by the pair of permanent magnets into the connection member is significantly reduced or prevented and therefore the effect of the direct-current magnetic field on a signal being transmitted through the connection member can be significantly reduced or prevented.

According to various preferred embodiments of the present invention, a non-reciprocal circuit element is provided with an input terminal, an output terminal and a ground terminal on any one of side surfaces of a ferrite, which are orthogonal to the two main surfaces of the ferrite. The input terminal, the output terminal and the ground terminal are arranged so as be capable of being visually checked by arranging another side surface, which is different from the side surface on which the input terminal, the output terminal and the ground terminal are provided, so as to face a mounting surface of a substrate. The input terminal, the output terminal and the ground terminal, and wiring line electrodes located on the mounting surface or electronic components mounted on the mounting surface are electrically connected to each other through connection members. Therefore, the connection state of the non-reciprocal circuit element to a wiring line electrode or an electronic component on the mounting surface of the substrate can be easily checked and impedance adjustment between the non-reciprocal circuit element and a wiring line electrode located on the mounting surface of the substrate on which the non-reciprocal circuit element is mounted or an electronic component mounted on the mounting surface can be easily performed by adjusting, for example, the length, thickness or number of the connection member.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a plan view and FIG. 1B is a circuit block diagram.

DETAILED DESCRIPTION OF THE PREFERRED EMBODIMENTS

Figure 1A:
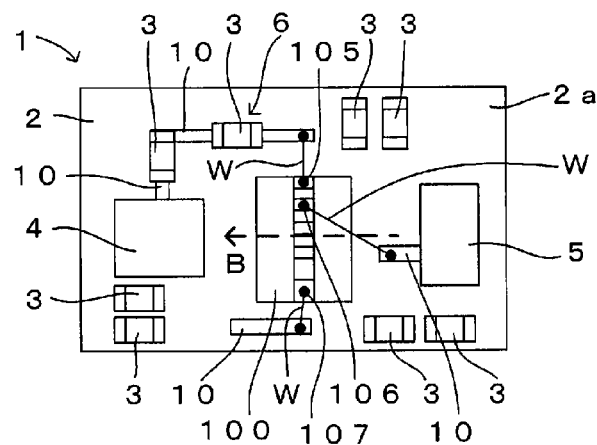
FIGS. 1A and 1B illustrate a preferred embodiment of a high-frequency module of the present invention, where
Figure 1B:
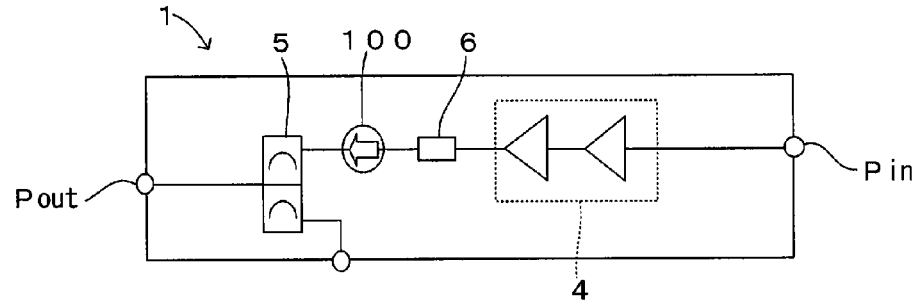
Figure 2:
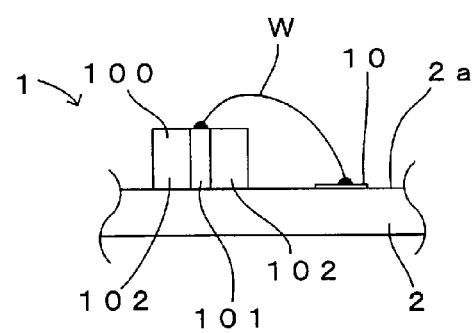
FIG. 2 is a magnified view of the principle portions of the high-frequency module of FIGS. 1A and 1B.

A preferred embodiment of a high-frequency module of the present invention will be described with reference to FIGS. 1A, 1B and 2. FIGS. 1A and 1B illustrate the preferred embodiment of the high-frequency module of the present invention, where FIG. 1A is a plan view and FIG. 1B is a circuit block diagram. FIG. 2 is a magnified view of the principle portions of the high-frequency module of FIGS. 1A and 1B.

A high-frequency module 1 illustrated in FIGS. 1A and 1B is a power amplification module preferably formed by mounting on a mounting surface 2a of a substrate 2 formed of, for example, a resin or a ceramic, a non-reciprocal circuit element 100 including an isolator having a characteristic of transmitting a signal only in a specific predetermined direction, chip components 3 such as chip capacitors, chip coils and chip resistors, a power amplifier 4 that amplifies a transmission signal and a branching circuit 5 such as a duplexer. The high-frequency module 1 is used in a transmission circuit section of a communication terminal such as a wireless communication device conforming to a wireless LAN standard or a Bluetooth (registered trademark) standard or a cellular phone. In addition, a matching circuit 6 is provided between the power amplifier 4 and the non-reciprocal circuit element 100 by mounting the chip components 3 on wiring line electrodes 10 located on the mounting surface 2a of the substrate 2. The chip components 3, the power amplifier 4 and the branching circuit 5 each correspond to an "electronic component".

As the substrate 2, for example, a multilayer substrate formed by firing a multilayer body including ceramic green sheets or a multilayer resin substrate on which predetermined wiring line electrodes 10 have been provided is selected and employed in accordance with the intended use of the high-frequency module 1. Furthermore, depending on the intended use of the high-frequency module 1, a substrate into which electronic components such as capacitors and coils have been built in may be adopted as the substrate 2.

The chip components 3 define various circuits that are necessary to form the high-frequency module 1 such as the matching circuit 6 and therefore as the chip components 3, for example, chip capacitors, chip coils and chip resistors are appropriately chosen and mounted on the substrate 2. The power amplifier 4, for example, has a function of amplifying a transmission signal or a function of amplifying a transmission signal in a high frequency band in accordance with the intended use of the high-frequency module 1 and may have any of various appropriate circuit configurations.

The branching circuit 5 includes, for example, a plurality of SAW filters, which allow a signal of certain frequency band to pass therethrough and outputs a signal component of the certain frequency band out of a signal output from the isolator 100 to an output port Pout after subjecting the signal component to filter processing. The matching circuit 6 matches an output impedance of the power amplifier 4 and an input impedance of the non-reciprocal circuit element 100.

Figure 5:
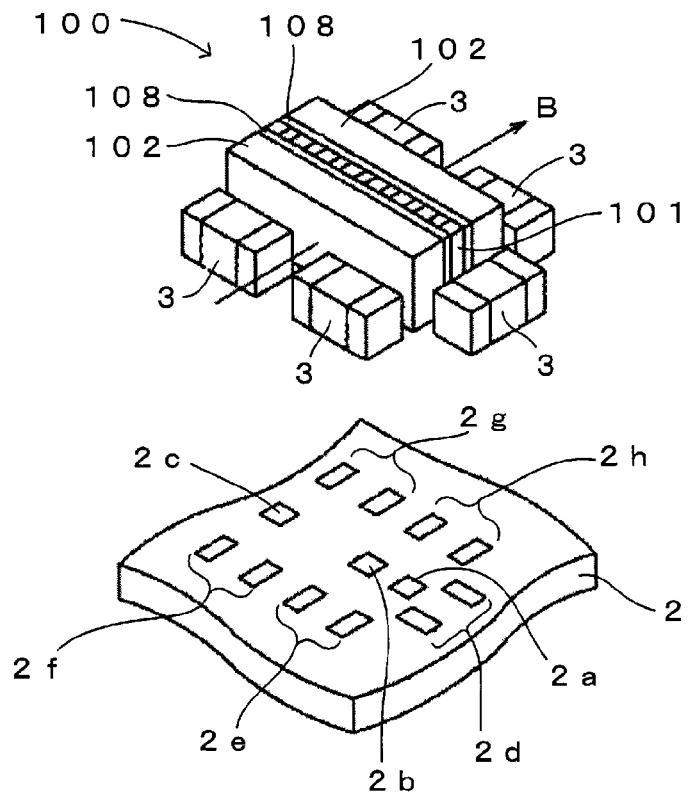
FIG. 5 illustrates an example of a non-reciprocal circuit element.
Figure 6:
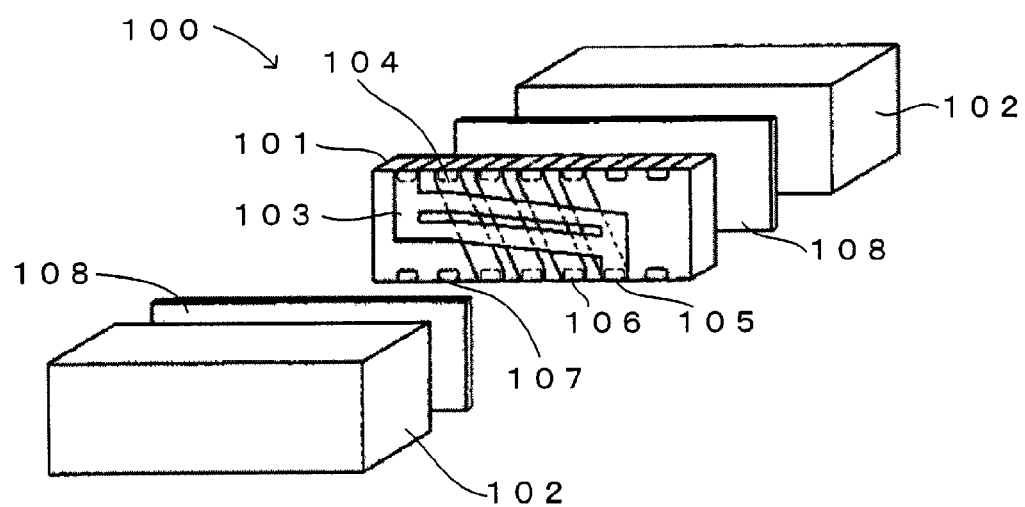
FIG. 6 is an exploded perspective view of the non-reciprocal circuit element of FIG. 5.

The non-reciprocal circuit element 100 preferably has substantially the same configuration as the non-reciprocal circuit element 100 illustrated in FIGS. 5 and 6 and includes a ferrite 101 including a pair of opposing main surfaces and a pair of permanent magnets 102 and is constructed such that the ferrite 101 is arranged between one pole of one of the permanent magnets 102 and the opposite pole of the other permanent magnet 102. Specifically, the ferrite 101 and the permanent magnets 102 each have a rectangular or substantially rectangular parallelepiped shape and the ferrite 101 and the permanent magnets 102 are bonded to each other with, for example, an epoxy adhesive 108 such that a direct-current magnetic field B of the permanent magnets 102 is applied in a direction perpendicular or substantially perpendicular to the main surfaces of the ferrite 101.

In addition, an input terminal 105, an output terminal 106 and a ground terminal 107 are provided one of the side surfaces of the ferrite 101, which are perpendicular or substantially perpendicular to the two main surfaces. In addition, on the ferrite 101, a first central electrode 103 is provided that has one end thereof connected to the input terminal 105 and another end thereof connected to the output terminal 106, and a second central electrode 104 is provided on the two main surfaces of the ferrite 101 in a state of being insulated from the central electrode 105 such that one end thereof is connected to the output terminal 106 and another end thereof is connected to the ground terminal 107.

The central electrode 103 includes a conductor film on the ferrite 101 and extends upward from the input terminal 105 at the bottom right of one of the main surfaces of the ferrite 101, and then branches into two and extends diagonally toward the top left at a comparatively small angle. The central electrode 103 then extends to the top left and wraps around onto the other main surface via an intermediary electrode provided on the upper end surface. In addition, the central electrode 103 is arranged so as to extend from the top left to the bottom right on the other main surface so as to be substantially superposed with the portion of the central electrode 103 located on the one main surface when viewed from the one main surface and is connected to the output terminal 106.

In addition, the central electrode 104 includes a conductor film on the ferrite 101 in a state of being insulated from the central electrode 103 on both of the main surfaces of the ferrite and is defined by the output terminal 106 at the bottom right of one of the main surfaces of the ferrite 101 so as to wind around the ferrite 101 while crossing the central electrode 103 at a comparatively large angle with respect to the long edges of the ferrite 101, and is connected to the ground terminal 107. The winding states of the central electrodes 103 and 104 with respect to the ferrite 101 in terms of, for example, the crossing angle of the central electrodes 103 and 104 and so forth, are appropriately chosen. As a result, electrical characteristics such as the input impedance and insertion loss of the non-reciprocal circuit element 100 are adjusted.

In addition, the ferrite 101 can be formed of, for example, a YIG ferrite and the central electrodes 103 and 104 and the terminals 105 to 107 can be formed as thick or thin films of silver or a silver alloy by using a method such as printing, transference, or photolithography, for example. Furthermore, insulating films that insulate the central electrodes 103 and 104 from each other can include dielectric thick films such as glass or alumina films or resin films such as polyimide films that are formed by using a method such as printing, transference or photolithography, for example.

The magnetic material of the ferrite 101 can be fired in an integrated manner with the insulating films and the various electrodes and in such a case, the various electrodes may be formed of Pd or Ag or Pd/Ag, for example, which are resistant to high-temperature firing.

Furthermore, a material adopted for the permanent magnets 102 may be, for example, a strontium ferrite magnetic material, which is excellent in terms of magnetic characteristics of residual magnetic flux density and coercivity and is excellent in terms of insulation characteristics in a high frequency band (low loss characteristic), or a lanthanum-cobalt ferrite magnetic material, which is excellent in terms of magnetic characteristics of residual magnetic flux density and coercivity, is suitable for size reduction and can be used even when taking into consideration its insulation characteristics in a high frequency band.

The thus-structured non-reciprocal circuit element 100 is mounted between the power amplifier 4 and the branching circuit 5 on the mounting surface 2a of the substrate 2 as follows. That is, as illustrated in FIG. 1A and FIG. 2, the non-reciprocal circuit element 100 is arranged such that another side surface, which is different from the side surface on which the input terminal 105, the output terminal 106 and the ground terminal 107 formed on the ferrite 101 are provided, faces the mounting surface 2a of the substrate 2. Then, the wiring line electrodes 10, the input terminal 105, the output terminal 106 and the ground terminal 107, which are located on the mounting surface 2a, are electrically connected by wires W using, for example, a typical wire bonding method. A wire W in this preferred embodiment corresponds to a connection member of the claims.

In addition, as illustrated in FIG. 1A and FIG. 1B, the output side of the power amplifier 4 and the input terminal 105 of the non-reciprocal circuit element 100 are connected to each other via a wire W and the matching circuit 6, and the input side of the branching circuit 5 and the output terminal 106 of the non-reciprocal circuit element 100 are electrically connected to each other via a wire W and a wiring line electrode 10. In addition, as illustrated in FIG. 1A, the wire W that is connected to the input terminal 105 is arranged perpendicular or substantially perpendicular to the direction of the direct-current magnetic field B generated by the pair of permanent magnets 102. The entire surface of the non-reciprocal circuit element 100 on the other side surface side of the ferrite 101 and the mounting surface 2a may be bonded to each other using a light-curable or heat-curable insulating adhesive, for example.

In this preferred embodiment, as illustrated in FIG. 1B, the high-frequency module 1 is provided in which a transmission signal input via the input port Pin is amplified by the power amplifier 4, the amplified transmission signal is input to the non-reciprocal circuit element 100 via the matching circuit 6 and the wires W, and the transmission signal output from the non-reciprocal circuit element 100 is output from the output port Pout via the branching circuit 5. In FIG. 1B, for ease of explanation, only the functions of the high-frequency module 1 that are necessary in the description of the present invention are illustrated. For example, illustration of a resist resin, which is located on the substrate 2 and which protects the surface of the substrate, is omitted.

As described above, in this preferred embodiment, the input terminal 105, the output terminal 106 and the ground terminal 107 are arranged so as that they can be visually checked by providing the non-reciprocal circuit element 100 with the input terminal 105, the output terminal 106 and the ground terminal 107 on any one of the side surfaces of ferrite 101, which are perpendicular or substantially perpendicular to the two main surfaces of the ferrite 101, and arranging another side surface that is opposite to the side surface on which the input terminal 105, the output terminal 106 and the ground terminal 107 are provided, so as to face the mounting surface 2a of the substrate 2. Then, the wiring line electrodes 10 located on the mounting surface 2a and the individual terminals 105 to 107 of the non-reciprocal circuit element 100 are electrically connected to each other via the wires W.

Therefore, since the connection state of the non-reciprocal circuit element 100 to the wiring line electrodes 10 on the mounting surface 2a of the substrate 2 can be easily visually checked, connection errors made when mounting the non-reciprocal circuit element 100 on the substrate 2 are prevented and the time taken to inspect the high-frequency module 1 is significantly reduced. In addition, the impedances between the non-reciprocal circuit element 100 and the wiring line electrodes 10 formed on the mounting surface 2a of the substrate 2 on which the non-reciprocal circuit element 100 is mounted or the electronic components 3 to 5 mounted on the mounting surface 2a can be easily adjusted by adjusting the lengths, thicknesses and number of the wires W.

In addition, the other side surface of the ferrite 101 different from the side surface on which the input terminal 105, the output terminal 106 and the ground terminal 107 are provided is arranged so as to face the mounting surface 2a of the substrate 2 with, for example, an insulating adhesive therebetween. As a result, the entirety of that other side surface of the non-reciprocal circuit element 100 can be arranged so as to be in contact with the mounting surface 2a of the substrate 2 and therefore, the non-reciprocal circuit element 100 is well balanced in a mounted state on the substrate and the non-reciprocal circuit element 100 can be prevented from being tilted when mounted on the mounting surface 2a of the substrate 2.

In addition, by connecting the non-reciprocal circuit element 100 and the wiring line electrodes 10 and other electronic components such as the electronic components 3 to 5 provided on the substrate 2 to each other using the wires W, the space provided for wiring on the substrate 2 is significantly reduced, and as a result, the substrate 2 can be reduced in size and therefore the high-frequency module 1 can be reduced in size.

In addition, since the output side of the power amplifier 4 and the input terminal 105 of the non-reciprocal circuit element 100 are connected to each other through a wire W and the matching circuit 6 and the input side of the branching circuit 5 and the output terminal 106 of the non-reciprocal circuit element 100 are connected to each other via a wire W and the wiring line electrode 10, the impedance between the power amplifier 4 and the non-reciprocal circuit element 100 and the impedance between the branching circuit 5 and the non-reciprocal circuit element 100 can be easily adjusted by adjusting the length, thickness, number and so forth of the wires.

In addition, since the non-reciprocal circuit element 100 is arranged between the power amplifier 4 and the branching circuit 5, the effect of noise radiated from the power amplifier 4 on a signal being transmitted through the branching circuit 5 is significantly reduced or prevented.

In addition, since the wire W connected to the input terminal 105 is arranged so as to be perpendicular or substantially perpendicular to the direction of the direct-current magnetic field B generated by the pair of permanent magnets 102, penetration of the wire W by the direct-current magnetic field B is significantly reduced or prevented and therefore the effect of the direct-current magnetic field B on a signal being transmitted by the wire W is significantly reduced or prevented.

Modifications will be described while referring to FIG. 3 and FIG. 4.

Figure 3:
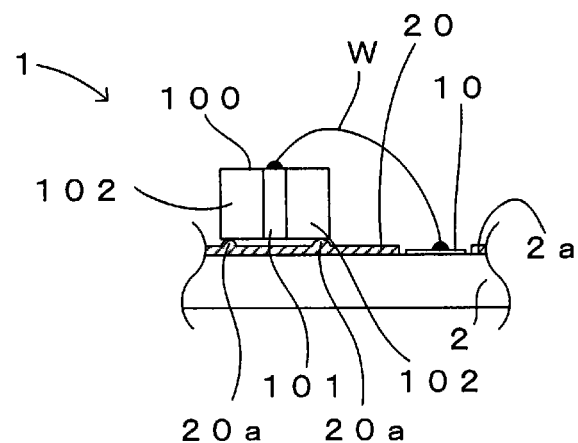
FIG. 3 illustrates a modification of a high-frequency module.

As illustrated in the modification of the high-frequency module 1 of FIG. 3, a resist resin 20 provided on the mounting surface 2a of the substrate 2 may be provided with at least three protrusions 20a and the non-reciprocal circuit element 100 may be arranged on the protrusions 20a.

Figure 4:
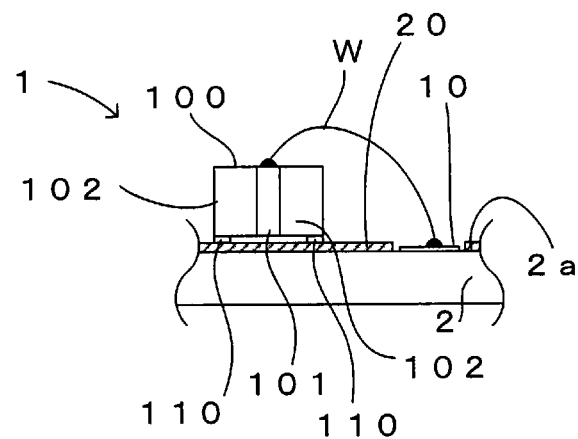
FIG. 4 illustrates a modification of a high-frequency module.

As illustrated in the modification of the high-frequency module 1 of FIG. 4, legs 110 formed of, for example, a resin may be provided at the four corners of the lower surface of the non-reciprocal circuit element 100, which faces the mounting surface 2a of the substrate 2.

With the configurations illustrated in FIG. 3 and FIG. 4, the non-reciprocal circuit element 100 can be arranged so as to float above the mounting surface 2a and the wiring line electrodes 10 and so forth can be arranged in a space below the non-reciprocal circuit element 100 and therefore the degree of integration of the high-frequency module 1 can be increased.

The present invention is not limited to the above-described preferred embodiments and can be modified in various ways so long as they do not depart from the spirit of the invention. For example, a configuration may be adopted in which the wire W connected to the output terminal 106 is oriented so as to be perpendicular or substantially perpendicular to the direction of the direct-current magnetic field B generated by the pair of permanent magnets 102. If this configuration is adopted, the same effect as for the wire W connected to the input terminal 105 as described above can be obtained. In the case where the input terminal and the output terminal are extracted in the same direction, the heights of the loops of the wires W from the mounting surface 2a may be adjusted so that the wire W connected to the input terminal 105 and the wire W connected to the output terminal 106 do not come into contact with each other. In addition, the orientations of the wires connected to the terminals 105 to 107 need not necessarily be perpendicular or substantially perpendicular to the direct-current magnetic field B.

In addition, the non-reciprocal circuit element 100 and the electronic components 3 to 5 may be directly connected to each other through the wires W. In addition, the high-frequency module 1 may be further provided with a cover composed of a non-magnetic metal or a magnetic metal, or may be subjected to molding using a resin.

Furthermore, the non-reciprocal circuit element 100 is not limited to being an isolator having the above-described configuration, and a well-known isolator having another configuration may be appropriately adopted as the non-reciprocal circuit element 100. Furthermore, the non-reciprocal circuit element 100 may include a circulator. For example, a central electrode may be located on surfaces of the pair of permanent magnets 102 that face the two main surfaces of the ferrite 101 and portions of the central electrode formed on the two permanent magnets 102 may be electrically connected to each other via intermediary electrodes located on the top and bottom end surfaces of the ferrite 101 in a state where the pair of permanent magnets 102 and the ferrite 101 have been joined together.

Furthermore, the electronic components provided on the substrate 2 are not limited to the above-described examples and appropriate or optimal electronic components may be selected and mounted on the substrate 2 in accordance with the intended use and design of the high-frequency module 1. For example, the high-frequency module 1 may be additionally provided with an interstage filter (SAW filter) or a power detector, and may be additionally provided with a switch, a multiplexer such as a duplexer or a coupler.

In addition, as a connection member, other than a wire, a conductive member such as a metal thin plate or a metal columnar member may be used.

Preferred embodiments of the present invention and modifications thereof can be widely applied to high-frequency modules that include a substrate on which a non-reciprocal circuit element is mounted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency module comprising:
a substrate; and
a non-reciprocal circuit element mounted on the substrate, the non-reciprocal circuit element including:
a ferrite having a rectangular or substantially rectangular parallelepiped shape and including two opposing main surfaces;
a pair of permanent magnets that are provided at the two main surfaces so as to apply a direct-current magnetic field to the ferrite;
an input terminal, an output terminal and a ground terminal provided on any one of side surfaces of the ferrite that are perpendicular or substantially perpendicular to the two main surfaces of the ferrite;
a first central electrode that is provided on the ferrite, that has one end thereof connected to the input terminal and that has another end thereof connected to the output terminal; and
a second central electrode that is provided on both main surfaces of the ferrite in a state of being insulated from the first central electrode, that has one end thereof connected to the output terminal and that has another end thereof connected to the ground terminal; wherein
the non-reciprocal circuit element is arranged such that another side surface different from the side surface on which the input terminal, the output terminal and the ground terminal are provided faces a mounting surface of the substrate and a wiring line electrode located on the mounting surface or an electronic component located on the mounting surface and at least one of the input terminal, the output terminal and the ground terminal are electrically connected to each other via a connection member.

2. The high-frequency module according to claim 1, wherein a connection member connected to the input terminal is perpendicular or substantially perpendicular to a direction of the direct-current magnetic field generated by the pair of permanent magnets.

3. The high-frequency module according to claim 1, wherein the high-frequency module is a power amplification module.

4. The high-frequency module according to claim 1, wherein the substrate is made of resin or ceramic.

5. The high-frequency module according to claim 1, wherein the chip components include at least one of a chip capacitor, a chip coil, a chip resistor, a power amplifier that amplifies a transmission signal, and a branching circuit.

6. The high-frequency module according to claim 1, wherein the substrate is a multilayer substrate including a plurality of ceramic or resin layers with electrodes thereon.

7. The high-frequency module according to claim 1, further comprising legs provided at corners of a lower surface of the non-reciprocal circuit element that space the non-reciprocal circuit element from the mounting surface of the substrate.

8. The high-frequency module according to claim 1, wherein the connection member connected to the output terminal is perpendicular or substantially perpendicular to a direction of the direct-current magnetic field generated by the pair of permanent magnets.

9. The high-frequency module according to claim 1, further comprising a cover composed of a non-magnetic metal or a magnetic metal.

10. The high-frequency module according to claim 1, wherein the non-reciprocal circuit element includes one of an isolator and a circulator.

11. The high-frequency module according to claim 1, further comprising at least one of an interstage filter, a power detector, a switch, a multiplexer, a duplexer, and a coupler.

12. The high-frequency module according to claim 1, further a resist resin provided on the mounting surface of the substrate.

13. The high-frequency module according to claim 12, wherein the resist resin includes at least three protrusions and the non-reciprocal circuit element is arranged on the at least three protrusions.

14. The high-frequency module according to claim 1, further comprising chip components mounted on the mounting surface.

15. The high-frequency module according to claim 14, wherein the non-reciprocal circuit element is directly connected to the chip components.

16. The high-frequency module according to claim 1, further comprising a power amplifier and a branching circuit mounted on the mounting surface, wherein an output side of the power amplifier and the input terminal of the non-reciprocal circuit element are connected to each other via a connection member and an input side of the branching circuit and the output terminal of the non-reciprocal circuit element are connected to each other via a connection member.

17. The high-frequency module according to claim 16, wherein the branching circuit includes a plurality of SAW filters.

18. The high-frequency module according to claim 16, further comprising a matching circuit that matches an output impedance of the power amplifier and an input impedance of the non-reciprocal circuit element.

19. A communication device comprising:
a transmission circuit including a high-frequency module, the high frequency module including
a substrate; and
a non-reciprocal circuit element mounted on the substrate, the non-reciprocal circuit element including:
a ferrite having a rectangular or substantially rectangular parallelepiped shape and including two opposing main surfaces;
a pair of permanent magnets that are provided at the two main surfaces so as to apply a direct-current magnetic field to the ferrite;
an input terminal, an output terminal and a ground terminal provided on any one of side surfaces of the ferrite that are perpendicular or substantially perpendicular to the two main surfaces of the ferrite;
a first central electrode that is provided on the ferrite, that has one end thereof connected to the input terminal and that has another end thereof connected to the output terminal; and
a second central electrode that is provided on both main surfaces of the ferrite in a state of being insulated from the first central electrode, that has one end thereof connected to the output terminal and that has another end thereof connected to the ground terminal; wherein
the non-reciprocal circuit element is arranged such that another side surface different from the side surface on which the input terminal, the output terminal and the ground terminal are provided faces a mounting surface of the substrate and a wiring line electrode located on the mounting surface or an electronic component located on the mounting surface and at least one of the input electrode, the output electrode and the ground electrode are electrically connected to each other via a connection member.

20. The communication device according to claim 19, wherein the communication device is a wireless communication device or a cellular phone.

* * * * *